United States Patent [19]

Schultz

[11] 4,219,008
[45] Aug. 26, 1980

[54] METHOD AND APPARATUS FOR SOLAR HEATING AND SHADING

[76] Inventor: John Schultz, 615 Circle Dr., Solana Beach, Calif. 92075

[21] Appl. No.: 940,027

[22] Filed: Sep. 6, 1978

[51] Int. Cl.³ .......................... F24J 3/02; B61D 27/00
[52] U.S. Cl. ..................... 126/419; 126/422; 126/437; 165/40
[58] Field of Search ............... 126/270, 271, 400, 419, 126/422, 428, 430, 432, 436, 437; 237/1 A; 165/32, 40

[56] References Cited

U.S. PATENT DOCUMENTS

| | | | |
|---|---|---|---|
| 3,105,137 | 9/1963 | Sullivan et al. | 126/400 |
| 3,251,407 | 5/1966 | Crosthwait | 126/271 |
| 3,799,145 | 3/1974 | Butterfield | 237/1 A |
| 4,014,313 | 3/1977 | Pedersen | 126/270 |
| 4,027,821 | 7/1977 | Hayes | 237/1 A |
| 4,037,785 | 7/1977 | Madern | 126/400 |
| 4,129,118 | 12/1978 | Banke | 126/271 |
| 4,137,900 | 2/1979 | Brautigam | 126/271 |
| 4,144,931 | 3/1979 | Medico | 126/271 |
| 4,147,154 | 4/1979 | Lewandowski | 126/270 |
| 4,153,104 | 5/1979 | Ruder | 126/271 |

Primary Examiner—James C. Yeung
Assistant Examiner—Daniel O'Connor
Attorney, Agent, or Firm—Fulwider, Patton, Rieber, Lee & Utecht

[57] ABSTRACT

For use with a building having a transparent wall, a method, and a solar energy collection apparatus for performing the method, is provided by which the temperature and amount of sunlight within the building can be regulated during daylight hours, and the energy collected can be used for heating if required at nighttime. The apparatus includes an elongated solar collector that can be rotated about its longitudinal axis to vary the amount of sunlight that is permitted to enter the building.

2 Claims, 5 Drawing Figures

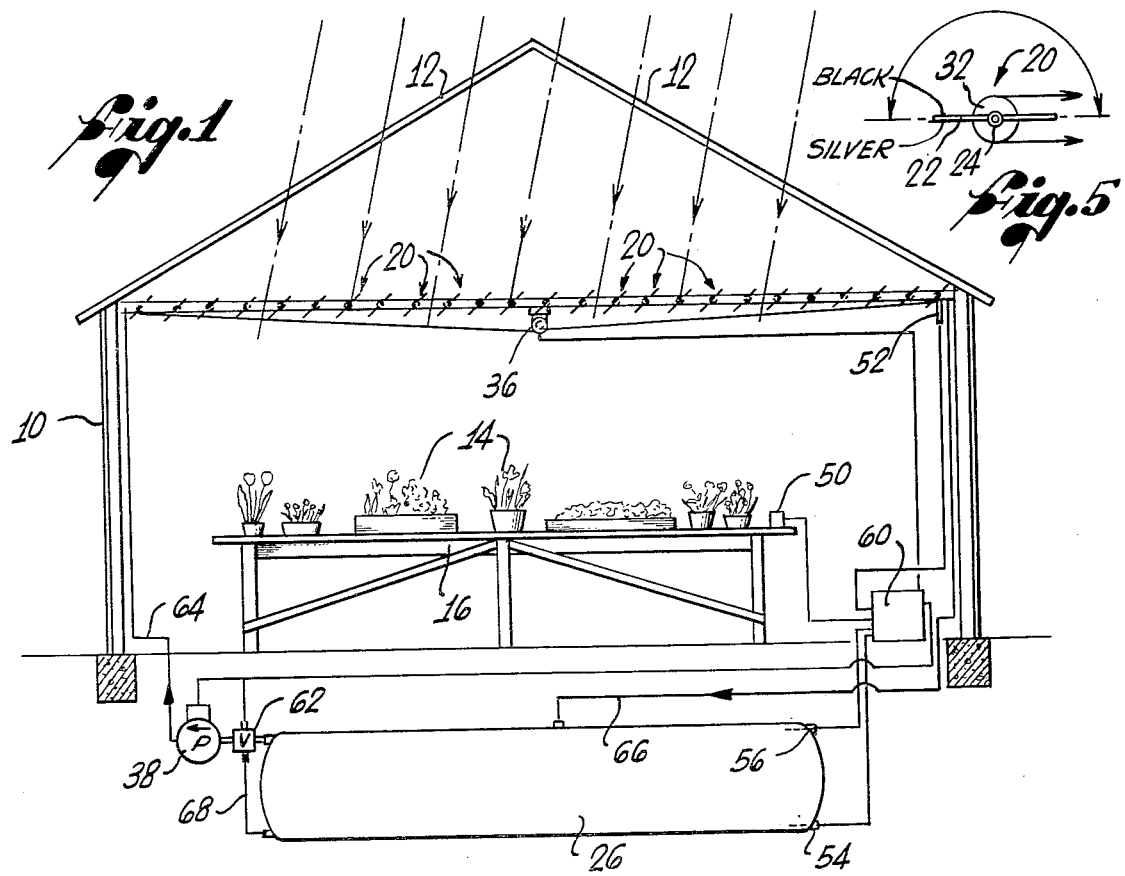
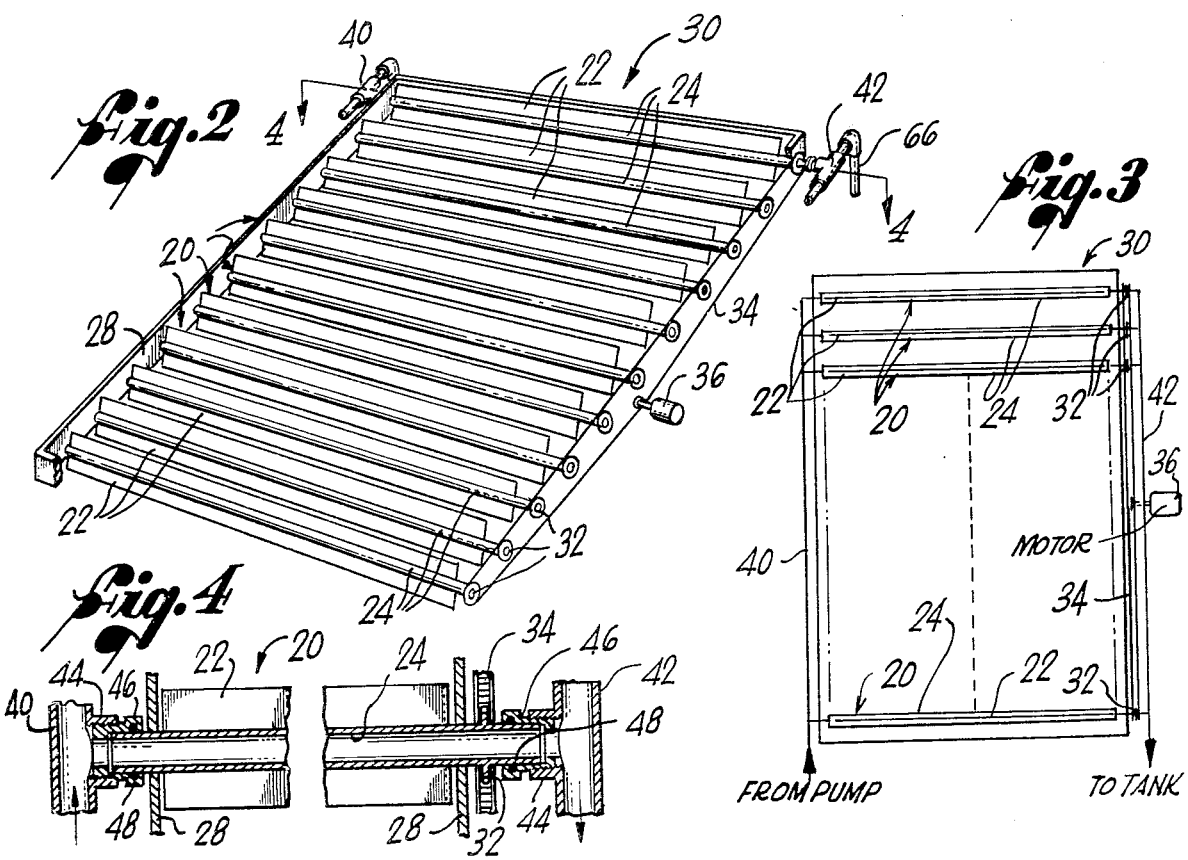

METHOD AND APPARATUS FOR SOLAR HEATING AND SHADING

BACKGROUND OF THE INVENTION

This invention relates generally to systems for controlling the thermal and illumination environment within a structure, and more particularly, to an environmental control system of the type employing solar collectors for storing and retrieving solar energy.

Buildings that include a large area of glass have experienced the problem of excessive heat gain through the glass during exposure to direct sunlight. Also, these buildings often tend to cool off in the absence of sunlight. As a consequence, such buildings often require air conditioning during the day and large amounts of heat to maintain a comfortable temperature at night.

Various solutions to this problem have been attempted such as providing window shades or draperies over the windows to decrease the heat gain during exposure to sunlight and to offer additional insulation against the egress of heat at night. Also, tinted or reflecting glass has been provided to decrease the heat gain of a building during the day.

In the specific field of greenhouse operation, for example, the above-mentioned problems are particularly troublesome, and are compounded by the desire of greenhouse operators to provide optimum shading for a particular species of plant being grown. In order to provide this desired shading, operators have employed open mesh screens above the plants or under the roof of the greenhouse, and these screens had to be deployed or stored, in addition to coping with the cooling and heating problems discussed above.

Further regarding greenhouse operation, it has long been recognized that certain processes of a plant's physiology are triggered by specific conditions of the plant's environment, such as the duration and intensity of daylight and the ambient temperature. Consequently, it is highly desirable for a greenhouse operator to be able to accurately control these conditions in order to artificially induce a desired effect in the plants being grown, such as germination or budding. Unfortunately, the accurate control required to accomplish these ends is difficult to achieve and very costly when undertaken in large scale by methods known heretofore.

Accordingly, there has existed a need for a convenient and effective method and apparatus for controlling the temperature and amount of sunlight within any structure having a large transparent wall area. As will become apparent from the following, the present invention satisfies that need.

SUMMARY OF THE INVENTION

The present invention resides in a method and apparatus for controlling the temperature within a structure having a transparent wall, and by which the amount of sunlight entering the structure can be selectively varied by providing a solar energy collector which can be moved to permit or restrict light from entering the structure. Moreover, the apparatus of the present invention is trouble free and reliable in use and can be arranged to operate automatically in response to various temperature and light sensors.

More specifically, the apparatus of the present invention may include an elongated, substantially rectangular solar energy collector which is arranged to be rotated to any required position in order to admit only the desired amount of sunlight into the structure with which it is used. Preferably, an array of these collectors is arranged to cover a transparent wall of a building, water is conducted through a tube in each collector to absorb heat during the day, and the heated water is stored in a tank so that the heat can be extracted and used later. It is to be understood that in this specification, reference to a transparent wall of a building is to be construed as including a transparent roof of the building, as in the case of a greenhouse. Further, it will be appreciated that the present invention is suited for use with a translucent wall or roof of a building, and all of these arrangements will be referred to generally hereinafter as a transparent wall.

The collectors are preferably constructed with a generally dark, light-absorbing surface on one side and a highly reflective surface on the other side. By this arrangement the dark side can be directed toward the sunlight during the day to enhance the absorption of heat.

If it is desired to heat the building at night, the collectors can be aligned with one another to completely cover the wall with the dark side facing into the building. Hot water from the storage tank is then circulated through the collectors, and heat is radiated into the building from the dark surface of the collectors. In this way, the reflective side of the collectors faces outwardly to reduce heat loss from radiation to the night air.

Further, the method and apparatus of the present invention can be used to cool the interior of a building by circulating cold water through the collectors and withdrawing heat from the hot air surrounding the collectors. By this arrangement, the the collectors can be rotated to the open position allowing full sunlight into the building while keeping the interior of the building relatively cool.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a schematic representation of the apparatus of the present invention mounted for use in connection with a building having a transparent wall, and in this instance the building is illustrated as a greenhouse, and the transparent wall is the roof;

FIG. 2 is a fragmentary, perspective view of an array of solar energy collectors as employed in the apparatus of the present invention;

FIG. 3 is a diagrammatic representation of the array of FIG. 2 illustrating the flow of water to and from the array;

FIG. 4 is a further enlarged, fragmentary, partly sectional view of one of the collectors of FIG. 2, and taken substantially along line 4—4 of FIG. 2; and FIG. 5 is a diagrammatic end view of one of the collectors of FIG. 4 and illustrating the rotational movement of the collector.

DETAILED DESCRIPTION

As shown in the exemplary drawings, the present invention is embodied in a solar energy collection apparatus for use with a building having a large wall or roof area that is substantially transparent. In exemplary FIG.

1, the apparatus of this invention is illustrated arranged for use with a conventional greenhouse 10 having a generally transparent roof 12, but it will be understood that the invention is also suited for use with any large transparent area, such as skylights, windows, glass walls of buildings, and the like.

In this instance, the transparent roof 12, permits sunlight to irradiate various plants 14, which are grown inside of the greenhouse 10, and generally, arranged on a bench 16. The direction of radiation of sunlight is represented by the arrows in FIG. 1. Naturally, this direction will change constantly as the angle incidence of sunlight changes due to rotation of the earth.

The physiology of some plants is such that they cannot tolerate full exposure to direct sunlight for an entire day. When such plants are being grown in a greenhouse, it is necessary to provide the proper amount of shading to avoid any adverse effects on the plants. For the same purpose, it is necessary to maintain the proper temperature within the greenhouse during daylight hours, as well as at night. In some instances it is desirable to control the environment within a greenhouse in order to artificially produce a desired effect in plants being grown, such as germination or budding.

In accordance with the present invention, a method and apparatus is provided by which the temperature and amount of sunlight within any structure having a large transparent wall can be easily and conveniently controlled in accordance with varying environmental needs within the structure. Further, the apparatus of this invention is trouble free and reliable in use, can be arranged to operate automatically, and the energy-saving character of this invention results in a substantial economic benefit to its user.

Toward the foregoing ends, several generally elongated solar energy collectors 20 are arranged side by side substantially covering the transparent wall through which sunlight is to be regulated. For example, in the apparatus illustrated in FIG. 1, the collectors 20 are arranged in a substantially horizontal plane under the transparent roof 12 and spanning the entire area of the greenhouse 10 so that any light passing through the roof 12 must also pass over the collectors 20 in order to enter the interior of the greenhouse 10.

In order to permit only the desired amount of sunlight into the greenhouse 10, the collectors 20 are arranged to be movable from a position substantially covering the transparent roof 12 and permitting no sunlight to enter the greenhouse 10, to a position permitting substantially all of the sunlight passing through the roof 12 to enter the greenhouse 10. A preferred arrangement for accomplishing this movement of the collectors 20 will be described in greater detail hereinafter.

With the collectors 20 in a position where at least some of the sunlight falls upon the collectors, the sun's energy tends to heat the collectors. Accordingly, as can best be seen in FIG. 4, each collector is constructed of an energy collecting fin portion 22 and a fluid conducting tube 24 disposed generally along the longitudinal axis of the collector 20. In order to collect and store the heat generated in the collector 20, a suitable fluid is conducted through the tube 24 where it absorbs some of the heat in the collector 20, and the heated fluid is then conducted to a tank 26 where the collected energy is stored for subsequent use.

Although the fluid employed is generally water, it will be appreciated that a gas such as air, or any other suitable heat transfer fluid, can be employed. Accordingly, any reference to a tank or pump herein should be construed to include any suitable energy storage or transfer means for the particular fluid employed, such as a fan for circulating a gas, or a rock bin for storing heat collected by a gas.

As best observed in exemplary FIG. 2, several collectors 20 can be mounted side by side in a frame 28 forming an array of collectors, indicated generally by reference numeral 30. It should be noted that the array 30 can be oriented in any desired position within a building where sunlight shines through a transparent wall and where it is desirable to control the amount of sunlight entering the building. That is, the array 30 can be mounted in a generally horizontal plane as illustrated in FIG. 1, in a generally vertical plane and parallel to a vertical transparent wall or window as in an office building or home, or at any desired angle, such as parallel to the roof 12.

The preferred arrangement for moving the collectors 20 in order to control the amount of sunlight admitted into the building with which the array 30 is being used can best be seen in FIG. 2. Each collector in the array 30 is mounted for rotation about its longitudinal axis and includes a sprocket 32. A chain 34 engages each sprocket 32 as well as a drive motor 36. By this arrangement, the collectors 20 can be rotated in unison to either open the array 30 for passage of light therethrough or close the array to prevent light from entering the building, as illustrated diagramatically in FIG. 5. The motor 36 can be designed to operate selectively in either direction and can be stopped at any desired position of the collectors 20.

The collectors 20 are constructed having a generally dark, light-absorbing outer surface on one side of the fin 22 and a highly reflective outer surface on the opposite side. Preferably, the collectors 20 are constructed with the dark side of the fin 22 having a flat black outer surface and the opposite side having a highly reflective white or silver colored surface. By this arrangement, the collector can be rotated to a position where either the black or silver side faces outwardly or inwardly with respect to the building to provide the optimum amount of heat absorption or radiation as desired.

In order to conduct heat out of the collectors 20, water from the tank 26 is supplied by a pump 38 to a first header 40 at one end of the collectors in the array 30. The water flows through the tubes 24 and is conducted from the array in a second header 42 which is connected to return the water to the tank 26.

Since the headers 40 and 42 remain stationary with respect to the building with which the apparatus is used and the collectors 20 are mounted for rotation, some provision must be made for conducting water through the collectors and headers while permitting this relative rotation. This can be accomplished by providing an internally threaded fitting 44 on each of the headers 40 and 42, as best observed in exemplary FIG. 4. An externally threaded bushing 46 fits into each fitting and receives the ends of the tube 24 for rotation therein. To make this rotary connection fluid tight, a conventional O-ring 48 or other suitable sealing means can be provided between the tube 24 and bushing 46.

In order to operate the apparatus of the present invention to best advantage, and therefore to perform the method of the present invention, it is necessary to gather certain information about the environment to be controlled and the temperature of the medium employed, usually water, at various locations within the apparatus. Toward this end, a sensor 50 is placed within the building, and includes a thermostat and a light intensity meter. The sensor 50 is preferably placed in a position near the area where the most accurate control of light intensity and temperature is desired, and in the greenhouse example illustrated in FIG. 1, the sensor 50 can be located on or near the bench 16. A series of light meters can be employed to obtain an average light intensity measurement at the bench 16.

The temperature of the water in the collectors 20 is measured by a thermometer 52, and, since the temperature of the water in the tank 26 can differ at various levels in the tank, the temperature of the water is measured at at least two different levels by a lower thermometer 54 and an upper thermometer 56. Of course, the temperature of the water in the tank can be measured at several levels within the tank, but two have been illustrated for simplicity of description.

With the information gathered by the above described sensor and thermometers, a workman would be able to practice the method of this invention by manually operating the present apparatus to achieve the desired control over light intensity and temperature within a building. However, in the preferred embodiment of the present invention, the information is fed into a control means 60 which is arranged in a manner well known in the art to perform the operation of the apparatus automatically in response to the above described information. The control means 60 can be any conventional automatic control device such as, for example, a microprocessor.

The output of the control means 60 is arranged to operate the motor 36 and the pump 38. Further, the control means 60 controls operation of a three-way valve 62 on the intake side of the pump 38. The valve 62 is arranged to selectively supply water to the pump 38 from either the top or the bottom of the tank 26 for a purpose which will be described below.

The control means 60 is arranged to move the collectors 20 to a position for admitting all available sunlight into the greenhouse 10 at day break. For the purpose of determining when this operation should occur, the control means 60 can be provided with a conventional 24-hour clock set for the usual hour of day break. Alternatively, an additional light intensity meter (not shown) can be provided above the collectors 20 or outside of the greenhouse 10 to sense the presence of ambient light.

When the desired light intensity within the greenhouse 10 is exceeded, according to measurements made by the sensor 50, the motor 36 is activated to close the collectors 20 slowly with the black side up until the desired light intensity is achieved. By this arrangement, the light intensity within the greenhouse 10 is monitored continuously, and the position of the collectors 20 is adjusted to irradiate the plants 14 with the optimum amount of sunlight.

With the black side of the collectors 20 exposed to direct sunlight, the collectors will tend to heat up and warm any water in the tubes 24 as described above. In order to store some of this heat energy for use later, cool water must be circulated through the collectors 20 and stored in the tank 26. Toward this end, when the thermometer 52 in a collector indicates that the water temperature in the collector is warmer than water available in the tank 26, the pump 38 will be activated to circulate water to the collectors through a supply conduit 64 connected to the first header 40, and back to the tank 26 through a return conduit 66 connected to the second header 42.

Normally, the water in the lower region of the tank 26 will be cooler than the water in the upper region. The control means 60, being apprised of the location of the cooler water from lower and upper thermometers 54 and 56, will cause the valve 62 to supply the pump 38 with the coolest water available, probably through a conduit 68 which communicates with the lower region of the tank 26.

The cool water circulating through the tubes 24 absorbs heat generated in the collectors 20 by the sunlight bearing upon the black side of the collectors 20. By this arrangement, it is also possible to cool air within the building with which the present apparatus is being used while permitting the maximum amount sunlight to enter the building. This can be accomplished by moving the collectors 20 to a position which permits entry of the maximum amount of sunlight, and circulating cool water through the tubes 24 thereby causing the collectors to absorb heat from the air surrounding the collectors. This procedure is particularly useful when the collectors 20 are located in a portion of a building which is likely to collect warm air, such as the area adjacent the roof 12 of the greenhouse 10 as illustrated in exemplary FIG. 1.

At nightfall the control means 60 activates the motor 36 to completely close the collectors 20 with the silver side facing outwardly thus acting as an insulator against transfer of heat out of the greenhouse 10 through the roof 12. The occurence of nightfall can be determined either by the 24-hour clock or second light meter described above.

If the temperature of the air within the greenhouse 10 falls below a desired level, as measured by the sensor 50, the control means 60 activates the pump 38 to circulate warm water from the tank 26 through the collectors 20. Heat will radiate primarily from the black side of the collectors 20 which is facing inwardly of the building, thereby raising the temperature of the air within the building. As described above, the control means 60 will cause the valve 62 to withdraw the warmest water available in the tank 26, and in this instance the valve 62 will probably place the intake of the pump 38 in communication with water from the upper region of the tank 26.

If desired, the heat stored in the tank 26 can be returned to the building by pumping the fluid through conventional radiators (not shown) in the building. Of course, the energy can also be pumped to a location remote from the building for any use desired, including simply expending the energy in order to cool the storage means. It should be noted that techniques are generally known for establishing temperature gradients and retrieving energy at preselected temperatures from the various energy storage devices referred to in this specification.

From the foregoing, it will be appreciated that the present invention provides a method, and a solar energy collection apparatus for performing the method, by which the temperature and amount of sunlight within a building can be regulated during daylight hours, and the energy collected can be used for heating if required at nighttime. Further, the apparatus of the present invention is trouble free and reliable in use, can be arranged to operate automatically in response to various temperature and light sensors, and can be employed to cool the building with which it is used while permitting complete entry of available sunlight into the building.

While a particular form of the invention has been illustrated and described, it will be apparent that various modifications can be made without departing from the spirit and scope of the invention.

I claim:

1. An apparatus for controlling temperature and sunlight within a structure having a transparent wall, said apparatus comprising:

a planar array of generally elongated rectangular solar energy collectors, said collectors including a black energy collecting surface, an oppositely facing reflective surface, and a tube disposed along the longitudinal axis of said rectangle for conducting a fluid therethrough, said collectors being arranged parallel to one another in said array and being connected to one another for rotation in unison about said longitudinal axis, said array further including a first header connected to one end of said tube of each of said collectors and a second header connected to the opposite end of said tube of each of said collectors;

a tank for storing said fluid, said tank including a first outlet at a first level in said tank and a second outlet at a second level in said tank, above said first level, said tank further including a first thermometer for measuring the temperature of said fluid at said first level and a second thermometer for measuring the temperature of said fluid at said second level;

a fluid circuit including a three-way valve connected to said first and second outlets and a pump for selectively placing said pump in communication with either said first outlet or said second outlet, a fluid supply conduit connecting said pump with said first header, and a fluid return conduit connecting said second header to said tank;

a motor rotating said collectors in unison;

a light sensor and a temperature sensor in said structure; and a control means associated with said light sensor, temperature sensor, first thermometer, and second thermometer for activating said motor in reponse to said light sensor and activating said pump and said valve in response to said temperature sensor and said first and second thermometers.

2. An apparatus for controlling temperature and sunlight within a structure having a transparent wall, said apparatus comprising:

a movable solar energy collector including a collector surface and a fluid passage;

a light sensor and a first temperature sensor within said structure;

means for moving said collector in response to said light sensor thereby increasing or decreasing the amount of light admitted into said structure through said wall;

a subterranean tank for storing a fluid to be circulated through said passage, said tank having a first outlet at a first level within said tank and a second outlet at a second level, above said first level, and a second temperature sensor at each of said levels within said tank;

pump means for circulating said fluid from said tank through said collector in response to said first and second temperature sensors; and a control means associated with said first and second temperature sensors for activating said pump, said control means being further arranged to activate a valve associated with said pump and said first and second outlets, to cause low temperature fluid to circulate through said collectors in response to a high temperature measured by said first temperature sensor, and to cause high temperature fluid to circulate through said collector in response to a low temperature measured by said first temperature sensor.

* * * * *